(12) United States Patent
Takano et al.

(10) Patent No.: US 7,200,917 B2
(45) Date of Patent: *Apr. 10, 2007

(54) METHOD OF MANUFACTURING STATOR COIL STRUCTURE FOR REVOLVING-FIELD ELECTRICAL MACHINE

(75) Inventors: Tadashi Takano, Mori-machi (JP); Susumu Ando, Mori-machi (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 284 days.

This patent is subject to a terminal disclaimer.

(21) Appl. No.: 10/711,601

(22) Filed: Sep. 28, 2004

(65) Prior Publication Data

US 2005/0044692 A1    Mar. 3, 2005

Related U.S. Application Data

(60) Division of application No. 10/064,362, filed on Jul. 6, 2002, now Pat. No. 6,831,389, which is a continuation-in-part of application No. 09/683,764, filed on Feb. 12, 2002, now Pat. No. 6,590,310.

(30) Foreign Application Priority Data

| Feb. 21, 2001 | (JP) | ............................ 2001-045282 |
| Feb. 21, 2001 | (JP) | ............................ 2001-045841 |
| Feb. 22, 2001 | (JP) | ............................ 2001-047179 |
| Jul. 11, 2001 | (JP) | ............................ 2001-210195 |

(51) Int. Cl.
*H02K 15/08* (2006.01)
*H02K 15/085* (2006.01)

(52) U.S. Cl. ........................ 29/596; 29/505; 242/432.3; 242/432.4; 242/432.6; 310/194

(58) Field of Classification Search .................. 29/596, 29/598, 605; 310/194; 242/432–433.4
See application file for complete search history.

(56) References Cited

U.S. PATENT DOCUMENTS

| 1,240,448 | A | * | 9/1917 | Hensley | ........................ 242/433 |
| 1,823,979 | A | * | 9/1931 | Jordan | ........................ 310/70 R |
| 2,969,928 | A | * | 1/1961 | Larsh | ........................ 242/432.6 |

* cited by examiner

*Primary Examiner*—Peter Vo
*Assistant Examiner*—Livius R. Cazan
(74) *Attorney, Agent, or Firm*—Ernest A. Beutler

(57) ABSTRACT

A number of embodiments of rotating electrical machines and methods for winding them that provides a high space utilization and very effective winding with less likelihood of damage to the insulation of the wire of the winding during the winding process. The arrangement basically does not require the winding needle to be moved back and forth in the slot between the poles but rather employs insulating inserts that are positioned on the axial faces of the poles outside of the gaps for guiding the wire from one end to the other so as to provide the high space utilization. In one embodiment the insulating insert effectively changes the circumferential length of the coil winding that decreases in an axial direction along their length.

11 Claims, 17 Drawing Sheets

METHOD OF MANUFACTURING STATOR COIL STRUCTURE FOR REVOLVING-FIELD ELECTRICAL MACHINE

CROSS REFERENCE TO RELATED APPLICATIONS

This application is a division of our application, Ser. No. 10/064,362, Filed Jul. 6, 2002, now issued as U.S. Pat. No. 6,831,389 on Dec. 14, 2004, which application is a continuation in part of our application Ser. No. 09/683,764, Filed Feb. 12, 2002, now issued as U.S. Pat. No. 6,590,310 on Jul. 8, 2003, all assigned to the assignee hereof.

BACKGROUND OF INVENTION

This invention relates to a method of making a stator coil structure for a rotating field electrical machine and more particularly to an improved coil method of forming such a device that will provide high efficiency and compact size.

Most rotating electrical machine are comprised of relatively rotatable rotors and stators. One of the rotor and stator carries a plurality of spaced permanent magnets that cooperate with electrical coil windings formed on the other of these members. It is the formation of the electrical coil windings that determines in large part the efficiency of these types of machines. Generally, the winding mechanisms and methods previously proposed have been something less than totally efficient and have at times resulted in very expensive methods and resulting products. This can be best explained by a description of the various types of structures and methods that have been employed for the coil windings. Generally there have been five methods of winding the coils. The first method may be characterized as a "direct winding" method wherein a transverse oscillating system is provided and a winding in the form of an enameled wire is wound around the magnet pole tooth of the core using a needle through which the winding is passed. The winding is wound adjacent the magnetic pole tooth and two upper and lower winding guides slide alternatively between the poles to deposit the windings on them. Alternatively the needle is reciprocated in the slot between the pole teeth and directly winds the wire onto the teeth.

The disadvantage with this type of winding method is that the needle for winding the wire must be placed into the slot from the open end thereof and or the guides must move into this area requiring a dead space between adjacent windings. This restricts the winding density and lowers the space factor thereof. Even when winding guides called formers are employed, the winding lacks alignment and it is difficult to increase the winding density. It is also difficult to apply this method to a stator having a large number of magnetic pole teeth or a revolving field type coil having a small inside diameter. Furthermore, the winding device is complicated in structure and becomes quite large.

When winding guides (formers) are used the resulting rubbing contact with the wire can strip or damage the insulating enamel coating and decrease the electrical efficiency.

In connection with an inner rotor type a stator core is divided into radially protruding portions with a continuous inner periphery and an outer peripheral core is fitted thereon. One way in which this type of device is made is that a coil is wound around a bobbin on the protruded portions. Then the outer peripheral core is fitted after the coil winding. This is called a bobbin winding method. Another way the inner rotor type is made, is that the windings are wound directly on a core having radially protruding sections with an insulating material interposed there between. Then the outer peripheral core is fitted thereon. This is called an outer winding method.

The disadvantages with this second type of construction is that the divided core must be fitted together so that dimensional accuracy is maintained and also to prevent subsequent separation of the parts. Also, the coils must be prevented from bulging out to the outer periphery of the device. This results in complexity in the structure and low production efficiency.

With the bobbin winding method, the winding may deform the bonding flanges and the winding density cannot be enhanced. In addition interference with the outer peripheral core and the dead spaces at the flanges thereof prevent the winding density from being enhanced. In this case, there are deficiencies of lowering the space factor as with the first mentioned method.

A third type of winding method uses divided pole cores. In this case, the armatures are formed as segments, each having a respective pole tooth. Each pole tooth is wound and then the individual segments are fixed together in a suitable manner, normally by welding using a laser beam. This method is not only expensive but raises problems in connection with the dimensional accuracy and the costs involved with the extra steps.

A further method employs what is called a "sawing" method. In this case, a solid core is employed having a plurality of teeth. A needle is passed sequentially through the slots between the magnetic pole teeth in a back and forth sawing motion to wind the winding. This method has the same disadvantages as the first method step described. Also high stresses are placed on the wire that can result in breakage or rupturing of the insulation.

Another method is the so-called "armadillo" type method. In this case, the core is formed in a circular shape and then deformed into a linear shape as used with a linear motor. The winding is then placed on the cores and then the device is again joined by welding the previously cut ends. Again, this method has problems of dimensional accuracy and also because of the stresses exerted on the windings during the successive curving operation, reliability is considerably decreased.

Another type of mechanism for winding employs a needle that is held outside of the slot between the armature teeth at one end of the core and a cam shaped member is provided for reciprocating the winding onto the core. These methods also have considerable disadvantages. In this type of mechanism, the holding and releasing mechanism for the winding is very complicated and the winding action must be repeated during each turn so that rapid productivity is not possible. In addition, the repetition of holding and releasing does not insure good alignment. Even though the needle never enters the slots, a mechanism for introducing the windings into the slots is needed. When this is done, the insulation on the windings may be disturbed.

Thus, the conventional rotating machine presents a problem in that the stator should having windings of a large diameter to permit low voltage and large current to obtain high power. In addition, a large number of magnetic pole teeth are desirable to reduce cogging and to provide smoother rotation and better efficiency. This again results in difficulties in forming the winding.

It is, therefore, a principal object to this invention to provide an improved winding method for coil assembly for a rotating machine wherein accurate coils can be formed having a high density with minimum gaps between the coil windings of adjacent pole teeth.

It is also an object to the invention to provide a method wherein the efficiency of such a machine can be significantly improved.

Our first identified, aforenoted co-pending application discloses a number of embodiments that achieve these objects. However there is still a possibility of obtaining of further advantages. With all of the embodiments therein tapered insert pieces are employed for guiding the Wire toward the opposite end of the pole from the needle. The height of the end of the tapered insert pieces in the area of the needle limits the number of possible windings in this area. Thus maximum winding density is somewhat compromised.

It therefore is a principle object of this invention to provide a method using insert pieces that achieve the objects of our aforenoted application and which offer the possibility of even greater winding density.

SUMMARY OF INVENTION

This invention is adapted to be embodied in a method of winding the coils of a rotating electrical machine. In this method, a circular core of magnetic material with a plurality of magnetic pole teeth extending radially from the circular core is provided. Each of the magnetic pole teeth defines a core and slots formed there between. Each of the slots defines a mouth that is formed between adjacent outer ends of the cores. The winding method comprises the steps of positioning a threading needle having an opening through which the wire for the winding of the coils is fed into proximity to one of the mouths. The needle opening is moved in a path around one of the pole teeth and at one side of the slot without moving the needle in any substantial distance along the length of the one pole tooth to form a first winding. The movement of the needle opening is continued in a path around the one of the pole teeth at the one side of the slot without moving the needle in any substantial distance along the length of the one pole tooth to form succeeding windings. The circumferential length of the pole teeth decreases in an axial direction along their length and the wire end is held at the end of the pole tooth spaced from the needle so that each successive winding forces the previous winding along the pole tooth toward the circular core without requiring movement of the needle in any substantial distance along the length of the one pole tooth so that the needle not be moved any substantial distance into the slot.

DETAILED DESCRIPTION

Figure 1:
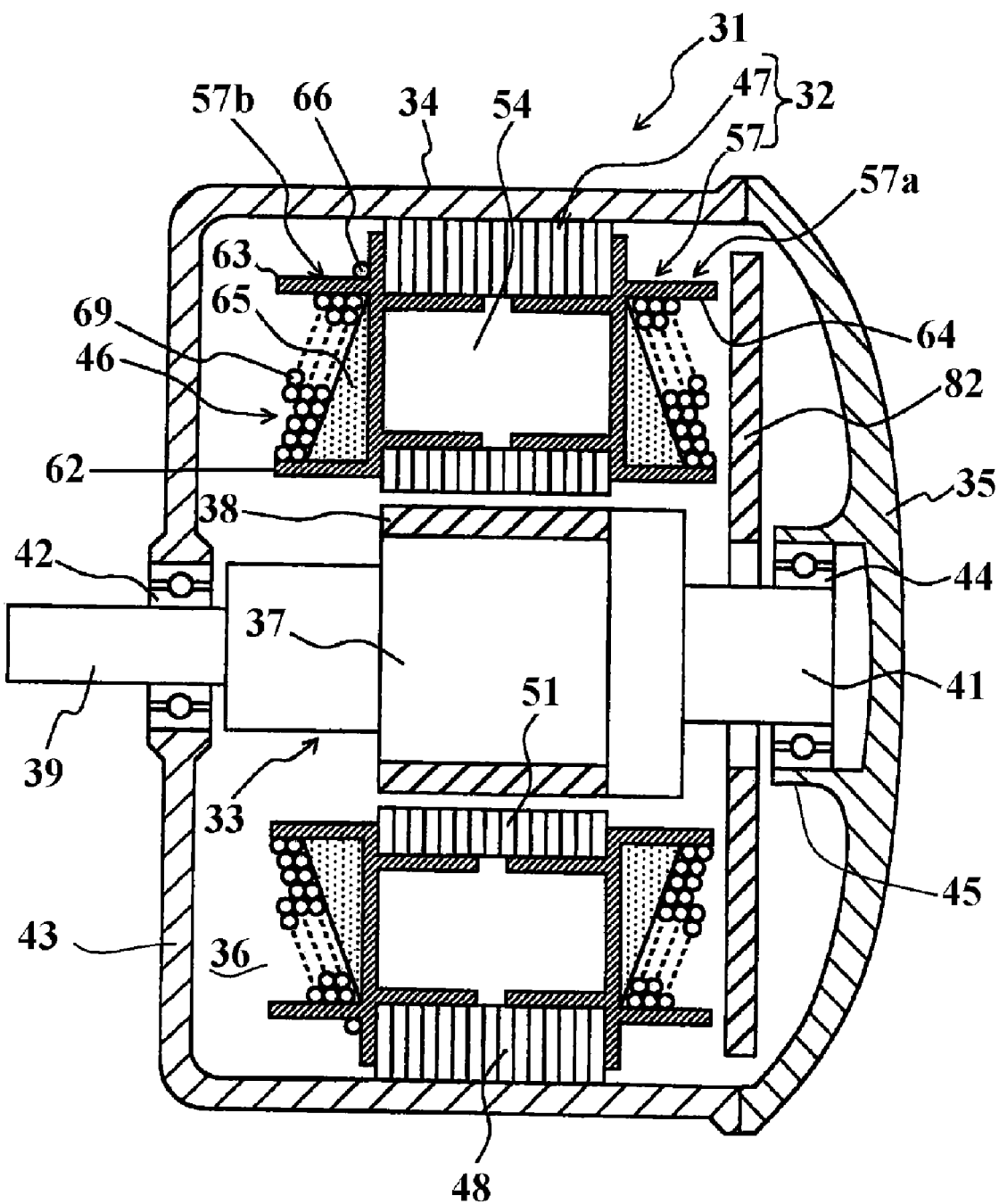
FIG. 1 is a cross sectional view taken through a rotating electrical machine formed in accordance with one embodiment of the invention and made employing one of the methods disclosed herein.

Referring now in detail to the drawings and initially primarily to FIGS. 1 through 8, a rotating electric machine constructed in accordance with the invention is identified generally by the reference 31. The rotating electric machine 31 may be either an electric motor or a generator depending upon the desired application.

The rotating electrical machine 31 is comprised of a stator assembly, indicated generally by the reference numeral 32, and a rotor assembly, indicated generally by the reference numeral 33. These components are contained within a housing assembly that is comprised of a cup shaped, main housing piece 34 and a cover plate 35, which is suitably attached thereto to form an enclosure 36 in which the stator assembly 32 and rotor assembly 33 are positioned.

The rotor assembly 33 is formed with a central portion 37 on which a plurality of circumferentially spaced permanent magnets 38 having alternating polarity are affixed in a known manner. The end portions of the rotor assembly 33 comprise shaft portions 39 and 41 that are journalled, respectively, in bearings 42 carried by an integral closure wall 43 of the cup shaped, main housing piece 34 and bearings 44 carried in a recessed portion 45 of the cover plate 35.

The construction of the rotor assembly 33 may be deemed to be of the general conventional type and any type known in this art might be employed. Also, although the described machine employs an arrangement wherein a coil winding assembly, indicated generally by the reference numeral 46 is provided on individual armature poles, to be described, formed on the stator assembly 32, it should be understood that the coil winding assembly 46 can be mounted on the rotor assembly 33 and the permanent magnets 38 may be mounted as part of the stator assembly including the cup shaped, main housing piece 34.

Figure 3:
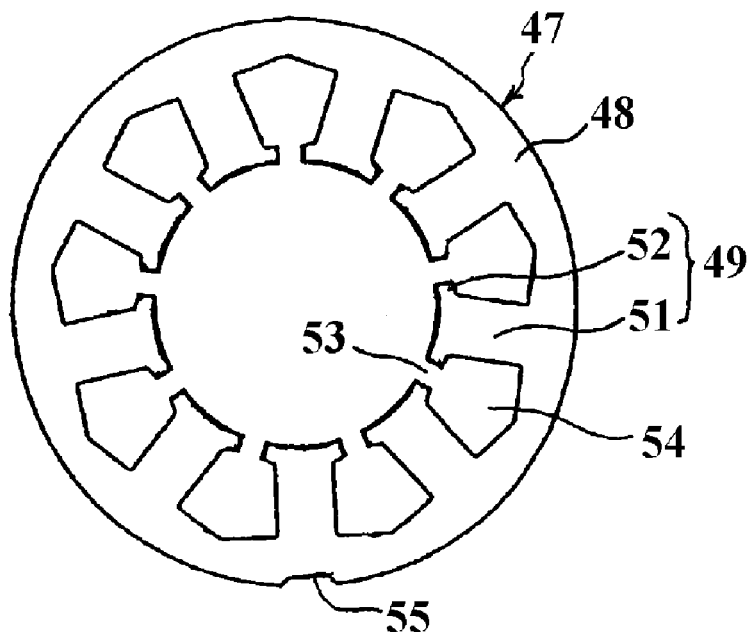
FIG. 3 is an end elevational view of the laminations of the magnetic core looking from one side.
Figure 4:
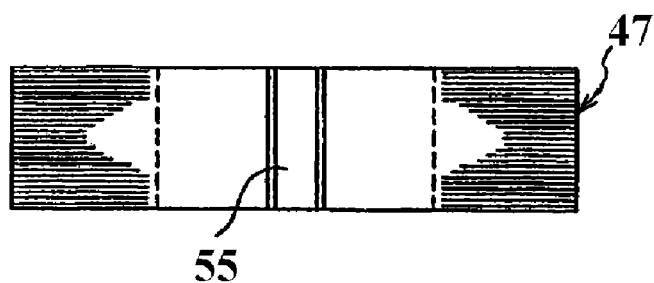
FIG. 4 is a side elevational view of the core.
Figure 5:
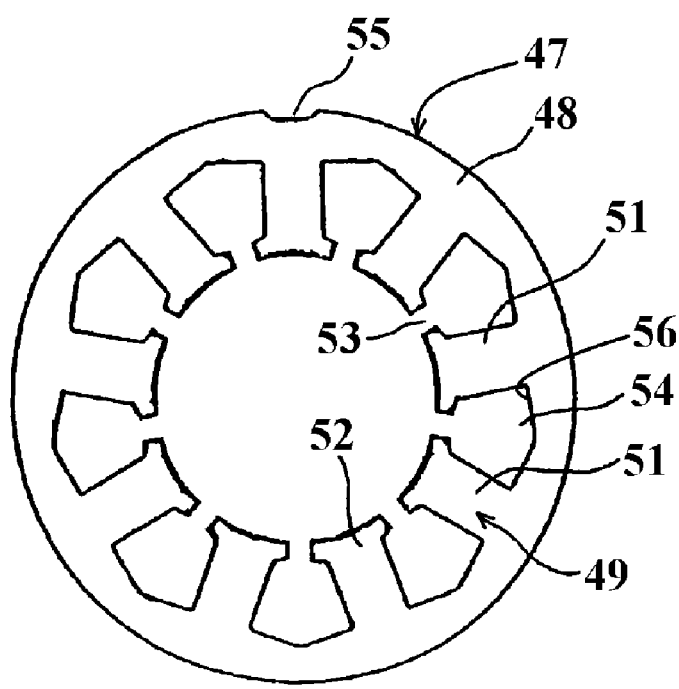
FIG. 5 is end elevational view of the core looking in the opposite direction from FIG. 3.

The stator assembly 32 is comprised of an armature core, indicated generally by the reference numeral 47, which is made up of a plurality of laminated armature plates as shown in FIGS. 3 through 5. In this embodiment, since the armature core 47 is the outer element of the rotating electric machine 31, it is comprised of a circular portion 48 from which a plurality of pole teeth, each indicated generally by the reference numeral 49, extend. The pole teeth 49 have generally rectangular portions 51 that extend outwardly from the circular portion 48 and which terminate in enlarged, projecting ends 52. Gaps 53 are formed between adjacent ends of these projecting ends 52, which form the outer termination of slots 54, formed between adjacent pole teeth 49.

In order to assist in the alignment of the lamination of the core pieces of the armature core 47, each of them is formed with a reference slot 55 on the outer periphery of their circular portion 48. This slot 55 assists in alignment as well as location within the cup shaped, main housing piece 34.

The ends of the slots 54 adjacent the circular portion 48 of the armature core 47 is defined by angularly disposed surfaces 56 formed on opposite sides of the bases of each of the pole teeth 49. These act as projections that cooperate with the projecting ends 52 at the outer ends of the teeth 49 so as to assist in locate an insulating bobbin forming members 57 around which the coil winding assembly 46 is formed as well as locating the individual windings themselves.

Figure 2:
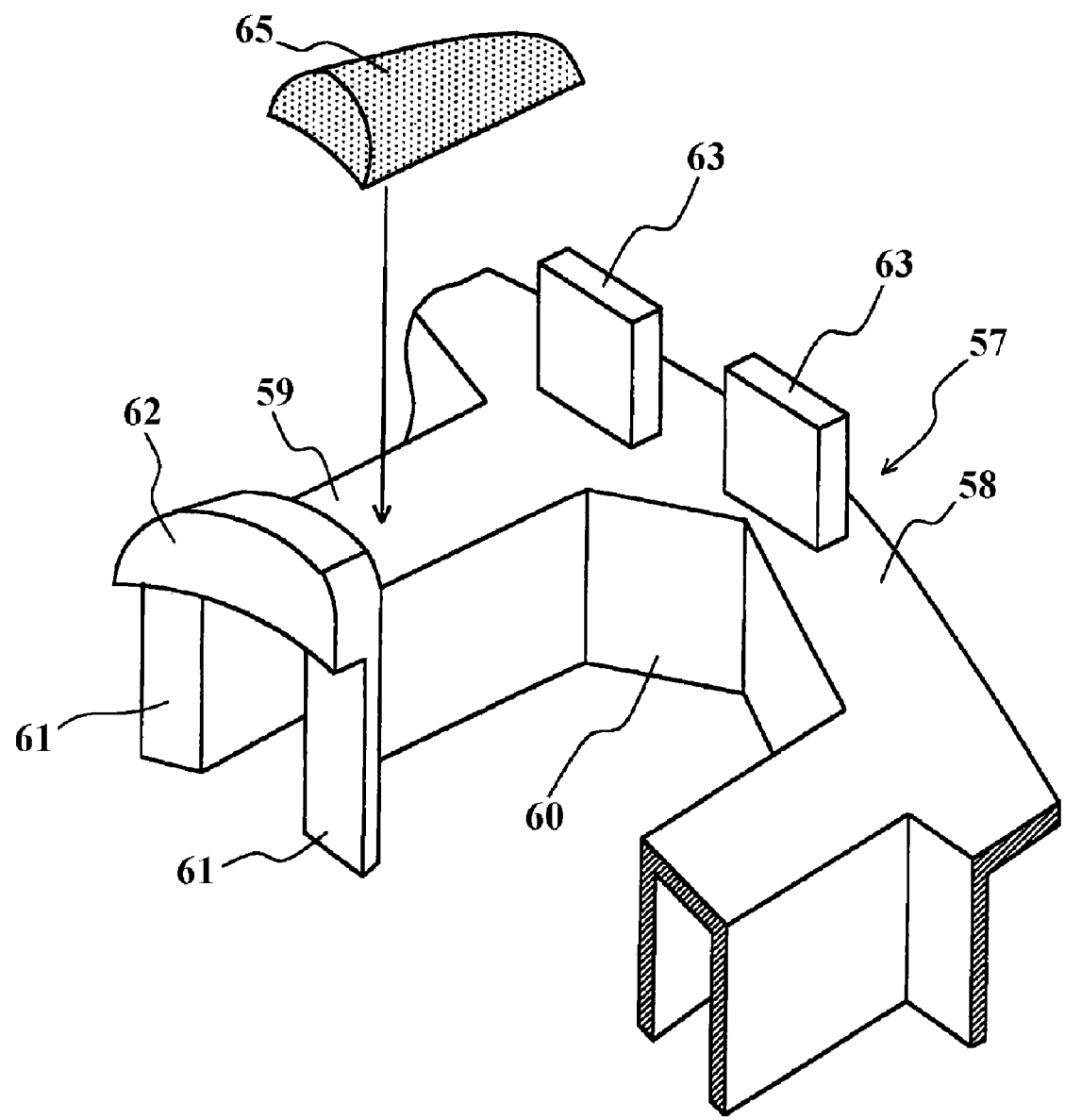
FIG. 2 is an enlarged, exploded perspective view of a portion of the insulator of the magnetic core arrangement.

Referring now to FIG. 2, the construction of the insulating bobbin forming members 57 will be described. This is comprised of right and left hand sections 57A and 57B, which have a substantially identical construction, except as will be hereinafter described. FIG. 2 is a typical view of the insulating bobbin forming member 57 regardless of the side involved. Like the armature core 47, the insulating bobbin forming member 57 is comprised of a circular portion 58 that has an L-shaped cross section and from which extend individual legs 59 of a generally U-shape which is complimentary to and snuggly received on the core pole teeth 49. Inclined surfaces 60 at the base of these legs 59 cooperate with the aforenoted angularly disposed surfaces 56 formed at the outer ends of the pole teeth 49 so as to provide a stop or abutment against which the coil windings actually engage. This construction also facilitates alignment.

Figure 6:
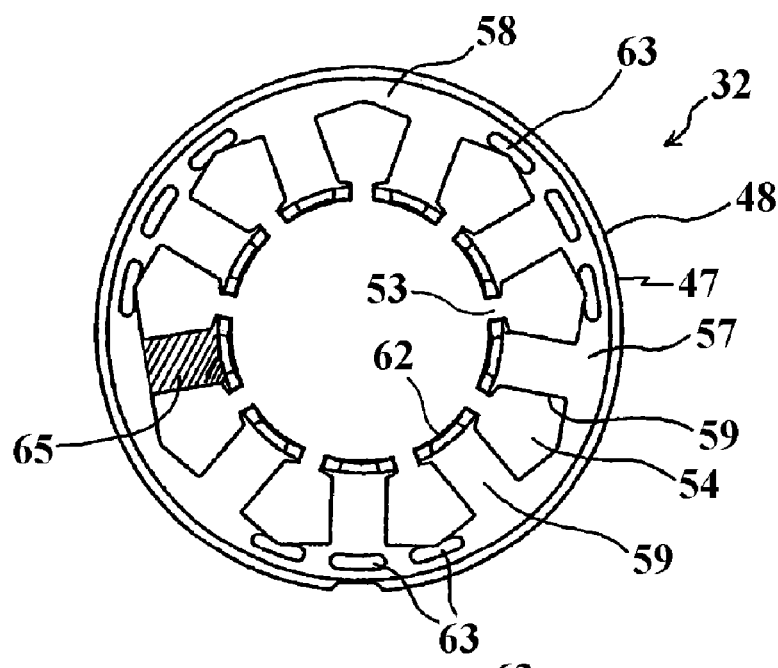
FIG. 6 is an end elevational view, in part similar to FIG. 3, but shows the construction with the insulator in place with one portion of the insulator shaded to show how the side of the insulator is tapered.
Figure 7:
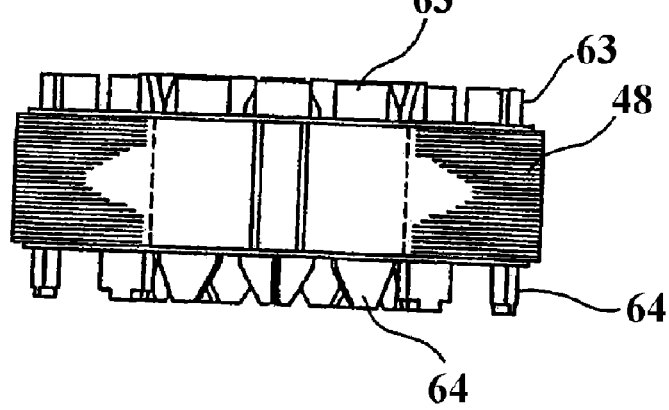
FIG. 7 is a side elevational view, in part similar to FIG. 4, but shows the core assembly with the insulator in place.
Figure 8:
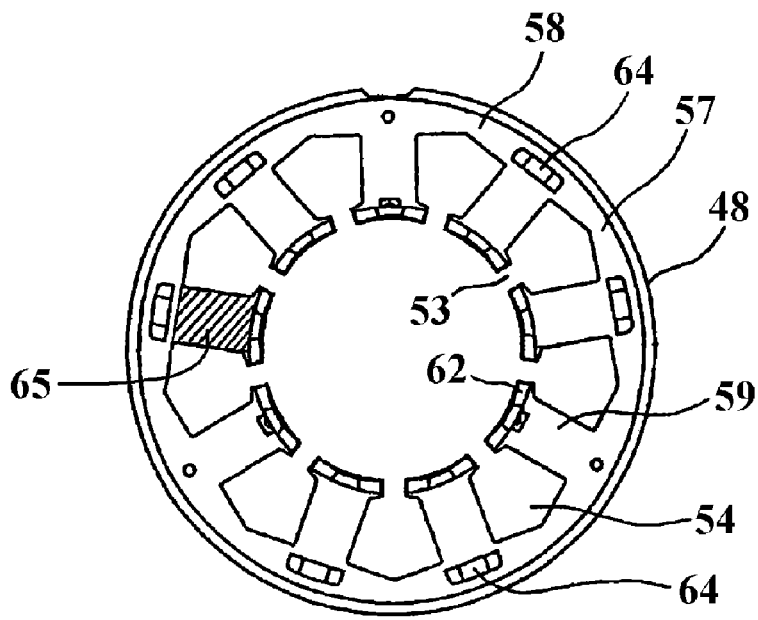
FIG. 8 is an end elevational view, in part similar to FIG. 5 looking in the opposite direction from FIG. 6 and showing one portion of the insulator shaded to show how the side of the insulator is tapered.

As may be seen in FIGS. 6 through 8, the outer periphery of the circular portion 58 of the insulating bobbin forming member 57 extends to a lesser circumferential extent than the outer periphery of the circular portion 48 of the armature core 47.

At the outer periphery of the insulator legs 59 and in the area between the slot gaps 53, the insulating bobbin forming member 57 have axially extending flange portions 61. These flange portions 61 are substantially co-extensive with the projecting ends 52 of the armature core portions 51. In addition, an arcuate portion 62 interconnects these axially extending flange portions 61 and extends axially outwardly so as to provide an abutment against which the coil winding assembly 46 will be confined as hereinafter noted. Preferably the arcuate portion has a thickness or height of $S_c$ that is equal to or greater than one half of the width of the slot $S_c$.

Further projections, indicated at 63, are formed at circumferentially spaced locations around the periphery of the insulating bobbin forming member 57, at least one of which is aligned with the insulator leg portion 59 and another of which is positioned adjacent the intersection between the inclined surfaces 60 as best shown in FIGS. 2 and 6. This construction is formed at one side of the insulator on one of the insulating bobbin forming member 57A or 57B. The spacing of these projections is chosen in order to facilitate the passage of wires connecting the individual coils of the coil winding assembly 46 as will become apparent. On the other side, there are similar further projections, indicated at 64, which may form a similar purpose.

In accordance with an important feature of the invention, special insulator inserts indicated by the reference numeral 65 are placed on the faces of the insulator legs 59 on one or preferably both of the insulators in the area between the respective arcuate portions 62 and further projections 63 and 64 thereon. These insulators are shown in lines in FIGS. 6 and 8 so as to indicate their relationship to the respective insulating bobbin forming member 57A or 57B.

The shape of these insulator inserts 65 may be of any of the configurations shown in FIGS. 10 through 12, 14 or 15. Basically, the configuration is such so that the inclination is in a generally downward direction from the outer peripheral edge of the respective pole tooth 49 toward the base thereof where it meets the circular portion 58. The purpose of this will be described in more detail shortly. Basically the shape is designed so as to promote the slipping of the wires radially outwardly from the outer periphery of the pole teeth 49 and specifically the rectangular portions 51 thereof toward the circular portion 58.

It should be noted that the further projections 63 and 64 need not be formed at the base of each of the pole teeth 49 because of the inclined surfaces 60 formed thereat which will tend to preclude the wire from slipping down along the incline below that point. However, the further projections 63 form a further purpose than stopping the wire coils from slipping down beyond this point as will become apparent.

Figure 10:
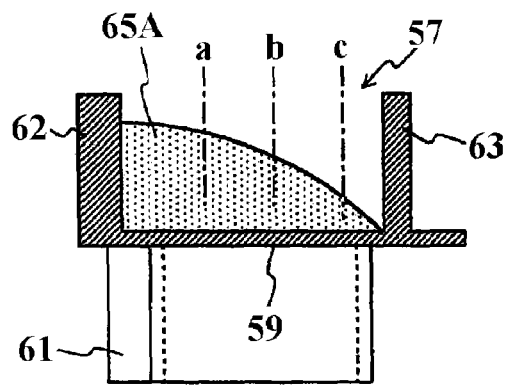
FIG. 10 is a cross sectional view taken along a radial plane through the insulating material and insert and showing the configuration thereof.
Figure 13:
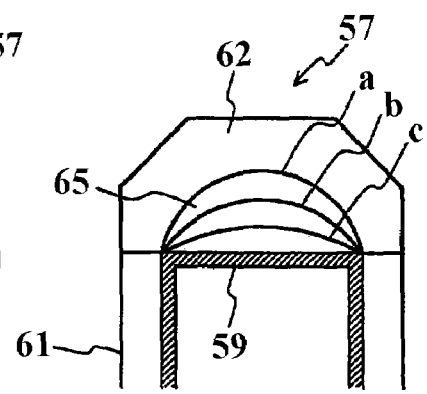
FIG. 13 is a view looking in the direction perpendicular to FIGS. 10 through 12 and shows the shape of the insulator surface along the planes a, b and c of those three figures.

Referring now specifically to the outer configuration of the various embodiments, FIG. 10 shows an embodiment wherein the insulator insert, indicated at 65A, is convexly curved from the radially inner end of the coil winding to the radial outer end. This curvature is when viewed in the radial direction as in FIG. 10. Looking in a perpendicular direction, as seen in FIG. 13, it will be seen that the curvature in this axial direction increases from one end to the other as shown by the section lines a, b and c.

Figure 11:
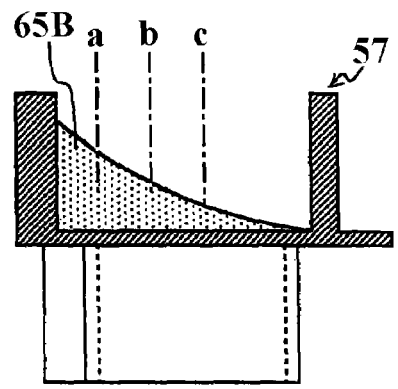
FIG. 11 is a cross sectional view, in part similar to FIG. 10, and shows another embodiment.

In the embodiment of FIG. 11, the shape of the insulator insert, indicated by the reference numeral 65B, is not a convex curve as shown in FIG. 10 but is in a concave curve. The curvatures in the other (axial) direction are the same as those shown in FIG. 13, however.

Figure 12:
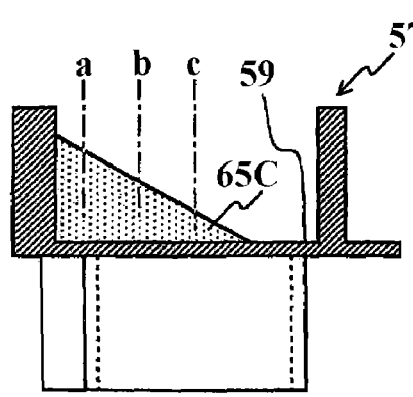
FIG. 12 is a cross sectional view, in part similar to FIGS. 10 and 11, and shows a third embodiment.

It is also not necessary that the curvature extend the full length of the coil winding. FIG. 12 shows an insulator insert 65C wherein the inclination stops short of the end of the leg portion 59 and short of the inclined surface 60. However, it is preferable to have this short area not be too great.

Figure 14:
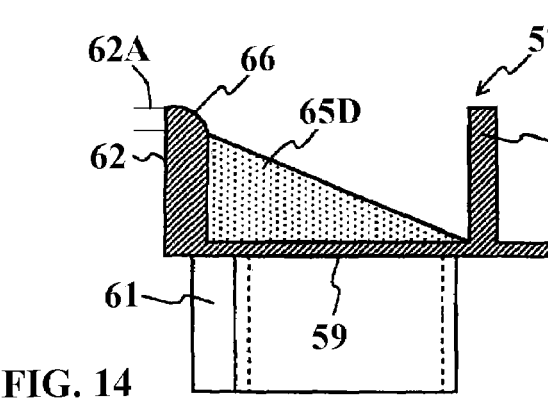
FIG. 14 is a view, in part similar to FIGS. 10, 11 and 12 and shows yet another embodiment of the invention.
Figure 15:
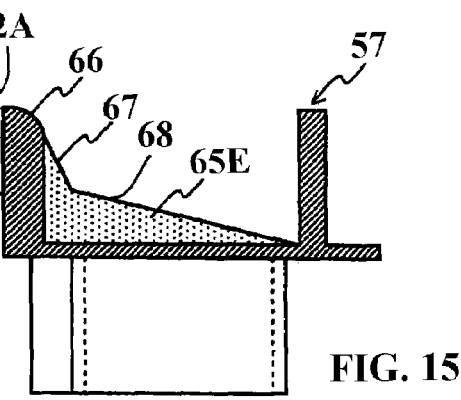
FIG. 15 is a cross sectional view, in part similar to FIGS. 10, 11, 12 and 14, and shows yet another embodiment of the invention.

FIGS. 14 and 15 show other configurations for the insert pieces that are particularly adapted for use with winding methods utilizing needles, which will be described later in connection with FIGS. 23 through 25. In these embodiments, the arcuate portion 62 at the radially inner end of the pole teeth 49 and specifically their rectangular portions 59 is provided with a curved or rounded edge 66 which leads downwardly toward an inclined insulator insert 65D. In this case, the inclination is linear in axial planes and nevertheless curved in radial planes as shown in FIG. 13.

FIG. 15 shows another inclined insulator insert 65E which has a stepped configuration consisting of a first, more steeply inclined portion 67 adjacent the end of the rounded edge 66 and then a second, more gradually inclined portion 68 that extends to the radially outer end of the respective tooth. Of course, other configurations also are possible.

In the embodiments of FIGS. 14 and 15 it is also possible to extend the upper end of the projections 62 in a radial direction as shown by the light line areas 62A in these figures to provide a wire guide so that the winding needle, to be described later, can be spaced radially inwardly from the gaps 53. If necessary for clearance purposes when the machine 31 is assembled or running these wire guides 62A may be cut off after the winding operation has been completed.

Although the various inclined insulator members have been described as separate pieces, they may be detachably affixed to the insulating bobbin forming members 57 or integrally formed thereon.

Figure 9A:
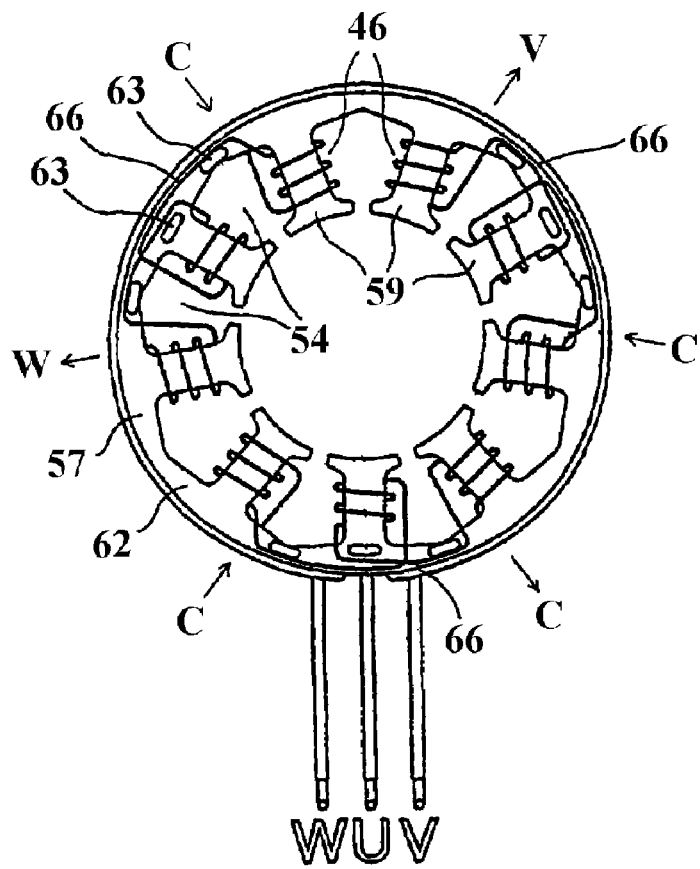
FIG. 9A is an end elevational view looking in the same direction as FIGS. 3 and 6 and shows the individual coil windings in place.
Figure 9B:
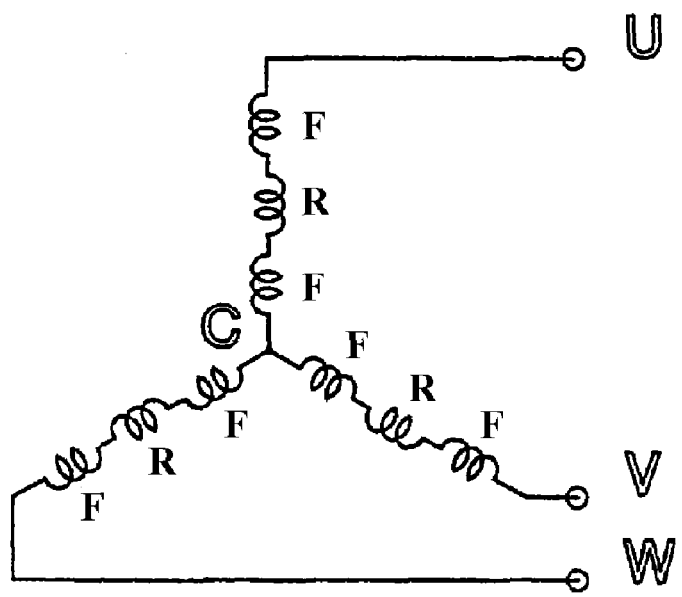
FIG. 9B is a schematic electrical diagram showing the coil windings.

It has been noted that there is a coil winding assembly 46 formed on the pole teeth 49 of the armature core 47. Although any winding pattern may be employed, a typical winding pattern that can be utilized in conjunction with the invention is shown in FIGS. 9A and 9B. In this particular winding, there is a three-phase, three pole series of windings resulting in a total of nine (9) armature pole teeth 49.

One possible winding arrangement is shown in these two figures wherein each of the phases U, V, and W have their coil windings formed on adjacent poles with a common connection C. Each coil winding is comprised of a forward winding, a reverse winding and a forward winding indicated by the reference characters F, R and F.

As may be seen in FIG. 9A, the insulator further projections 63 hold the ends of the windings for adjacent coils and space them outwardly both axially and radially from the winding of the individual coils to form a cross over area indicated by the reference numeral 70 which appears in FIGS. 1 and 9A. By so locating these cross over wires, it is possible to make the coil windings more compact, as will become apparent from the following description.

Figure 16:
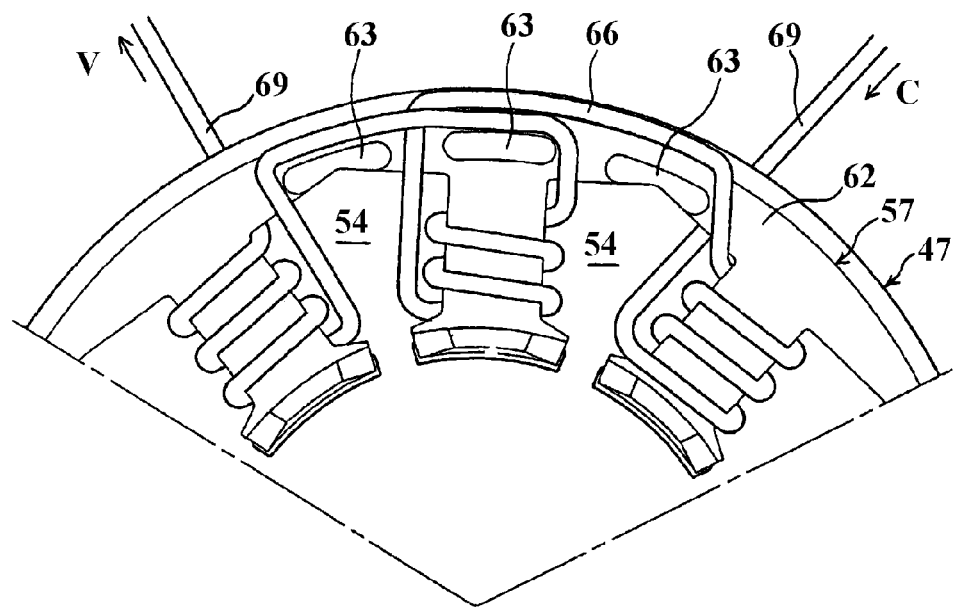
FIG. 16 is an enlarged end view showing one set of the windings and illustrating how they are formed and is basically an enlarged portion of FIG. 9A.

FIG. 16 is an enlarged view of the V-phase of the windings and shows the structure in more detail. In this figure, the individual strands of wire are indicated by the reference numeral 69.

Figure 17:
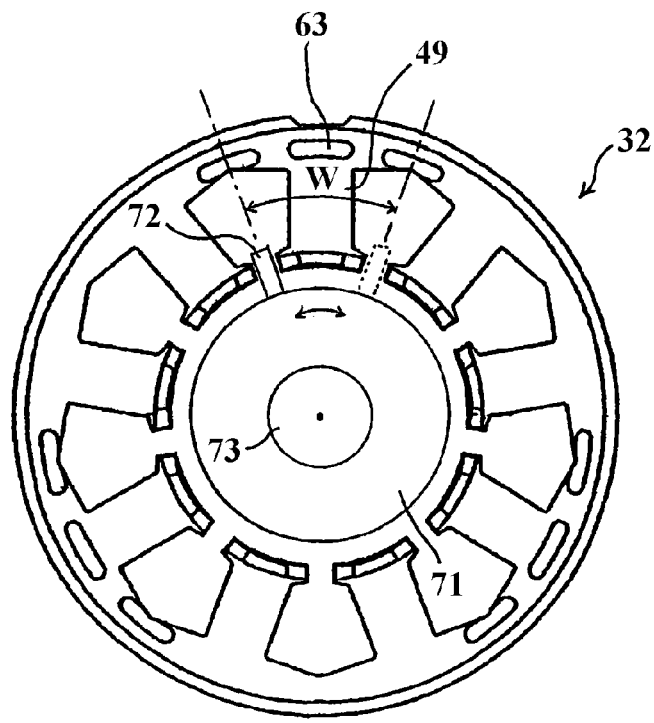
FIG. 17 is a view, in part similar to FIG. 6, and shows how the winding needle is associated with the slots between the pole teeth during the winding operation.

The method by which the winding is accomplished may be best understood and will now be described by reference primarily to FIGS. 17 through 19. The winding apparatus includes a needle carrier 71 that carries a winding needle 72 having a suitable configuration, examples of which will be described later by reference to FIGS. 22 through 25. The needle carrier 71 and needle 72 are formed with a wire guide opening 73 through which the individual enameled wire strand 69 passes from a feed roll 74. The path of wire travel is indicated by the arrows R in FIG. 19.

Figure 19:
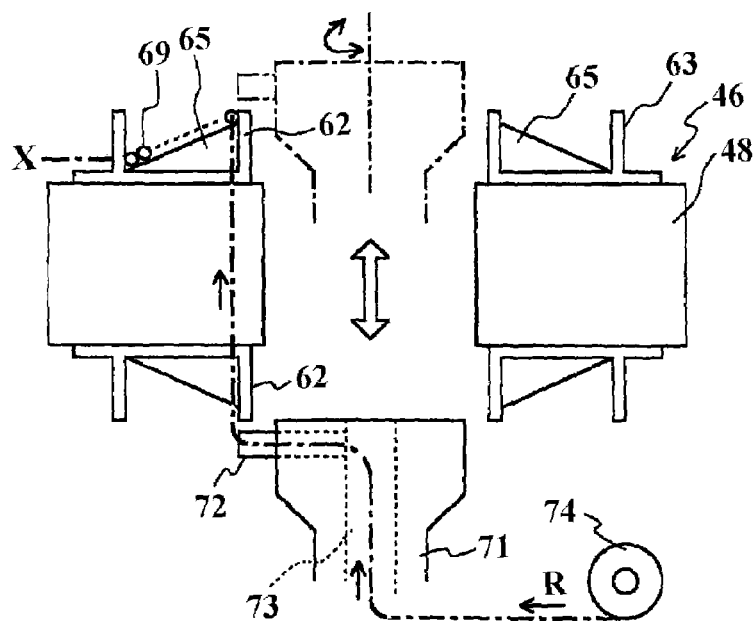
FIG. 19 is a side view looking in a direction perpendicular to FIG. 21 and showing the same paths of travel of the winding needle.

Initially, one end of the wire is clamped by a clamp at the position shown at X in FIG. 19, this being disposed radially outwardly beyond the end of the armature core 47 to forms one end of one of the coil windings of the coil winding assembly 46. The needle is then moved radially along the tooth but in an area, which is disposed outside of the slots 54 between the teeth and on one axial side thereof. In this way, when the windings are formed, the bulging portion that overlies the wire end will not fill the slots 54 but will be positioned in an axial direction outwardly from these gaps and along one side face of the individual pole teeth 49.

Figure 18:
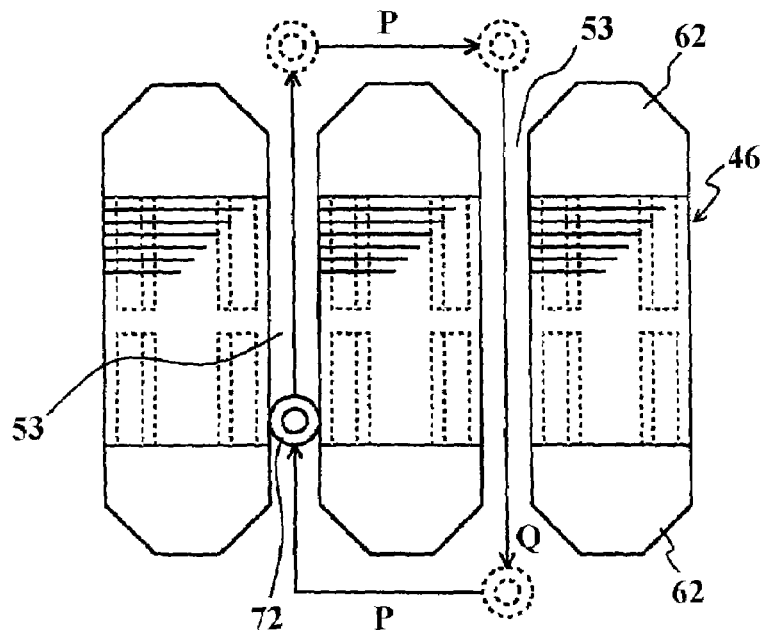
FIG. 18 is a projected side elevational view showing the path the needle takes when winding one of the coil.

The needle carrier 71 generally moves in a rectangular pattern around the individual pole teeth 49 and their overlying insulating bobbin forming members 57 as seen in FIG. 18. The winding needle 72 also rotates, as shown by the arrow in FIG. 17, through an arc W as it encircles the individual pole tooth 49. As will become apparent later, during winding, the needle 72 can either be radially positioned in the area immediately inside of the slot 54 in the area formed in the gaps 53 between the projecting ends 52 at the ends of the pole teeth 49, or radially inwardly of this area as long as during the winding operation the wire will contact the inner edge of the arcuate portion 62 of the insulating bobbin forming member 57.

As the wire is wound, it will be trapped by these edges and will engage the axially outermost portion of the insulator insert 65. Thus, as the needle traverses the path shown by the arrows P in FIG. 18, the wire strands 69 will be engaged with the axial outermost portions of the insulator insert 65. After traversing this area, then the needle 72 and needle carrier 71 is moved in the area indicated by the arrows Q in the radial direction between the adjacent pole teeth 49 and specifically the area of the slots 54.

As each winding is completed, the next winding will engage the previous winding and force it down the incline of the insulator insert 65 so that the wires will collect at the radial outer periphery of the slots 54. There the wire will be restrained by the inclined surfaces 60 of the insulating bobbin forming members 57.

Figure 20:
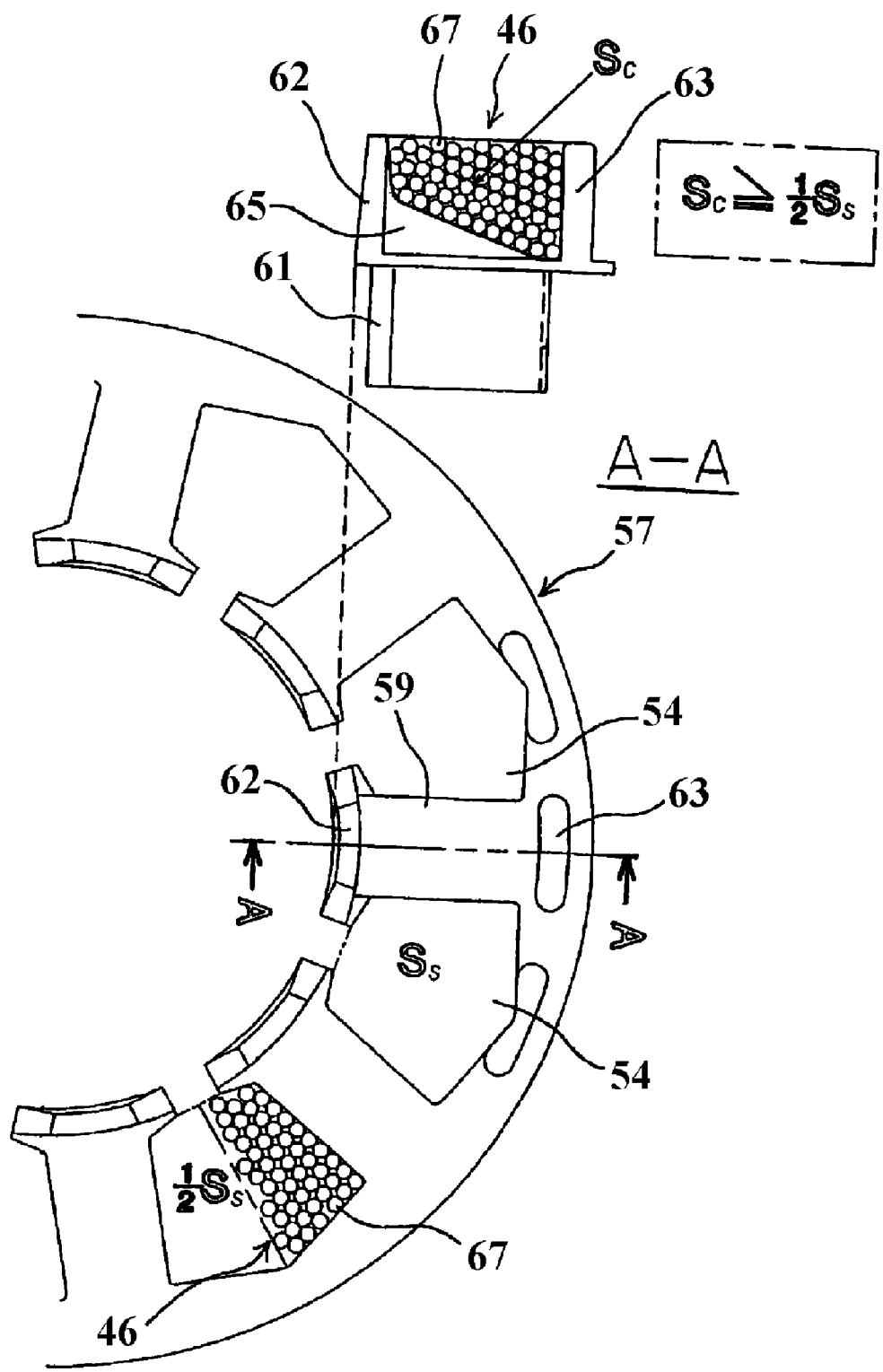
FIG. 20 is an enlarged view showing how the finished coil windings and illustrating the dimensional aspects thereof.

Then, the next series of windings is made and the resulting winding will appear as shown in FIG. 20. As seen in this figure, there is provided a very neat winding without bulges and which occupies substantially one half at the gap between the pole teeth 49 in the slots 54. This provides a very dense coil and insures maximum output of the machine.

Although only one needle carrier 71 and needle 72 is illustrated, preferably several can be provided at circumferentially spaced locations to speed up the winding process. For example there can be provided three of such assemblies, one for each winding phase. They can all be winding at the same time.

Figure 21:
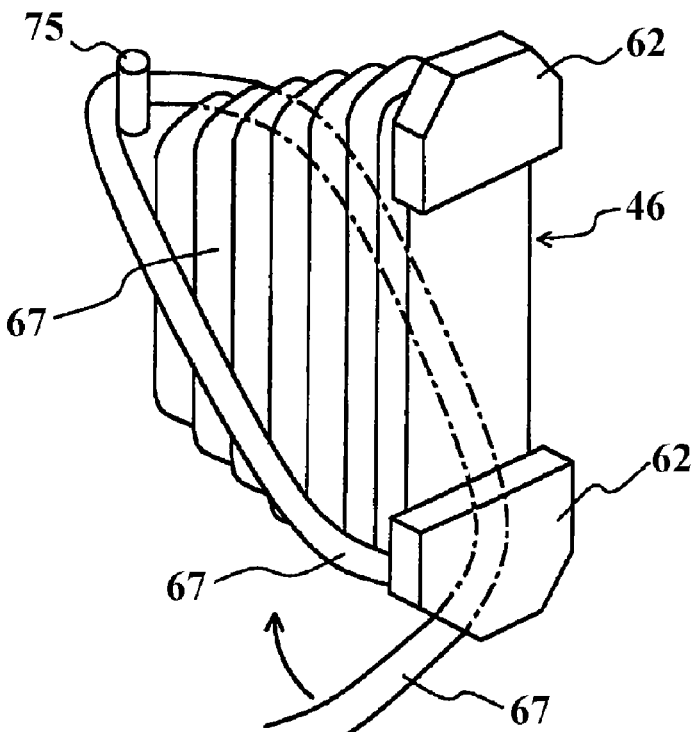
FIG. 21 is a perspective view showing one embodiment of the invention and associated with a single of the armature teeth.
Figure 22:
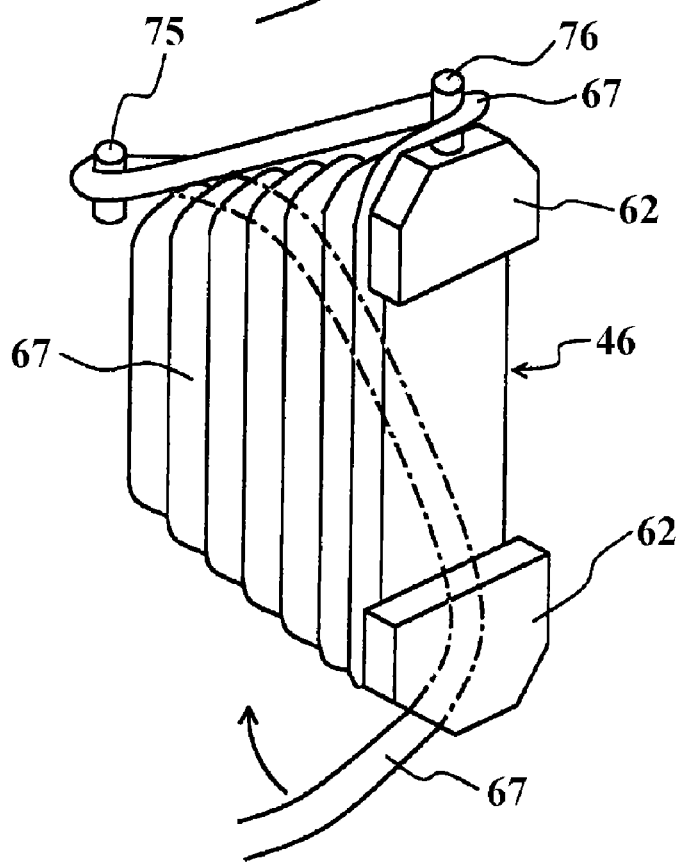
FIG. 22 is a perspective view, in part similar to FIG. 21, and shows another embodiment of the invention.

It has been noted that one end of the winding is held in the clamp at the position X as shown in FIG. 19. It may be that after each winding is completed, it would be helpful to provide a projection or post, indicated by the reference numeral 75 as shown in FIG. 21 at the base of the insulator assembly. The wire is looped around the projection 75 before the next winding on the individual pole teeth 49 is performed. This will assist in pulling the wire out toward the outer periphery of the winding adjacent the inclined surfaces 60 of the insulator. Also, similar posts 76 may be positioned on the arcuate portion 62 of the insulators and pole teeth, although this may not be necessary.

Figure 23:
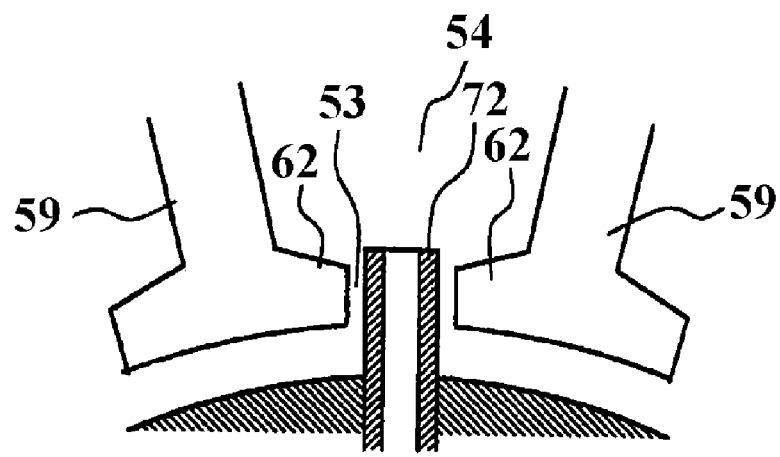
FIG. 23 is an enlarged view showing an embodiment of a needle in association with two of the pole teeth in accordance with of the invention.

One form of needle and winding method is shown in FIG. 23. In this case, the needle 72 can pass in the area of the gap 53 between the pole teeth at the outer periphery of the slots 54.

Figure 24:
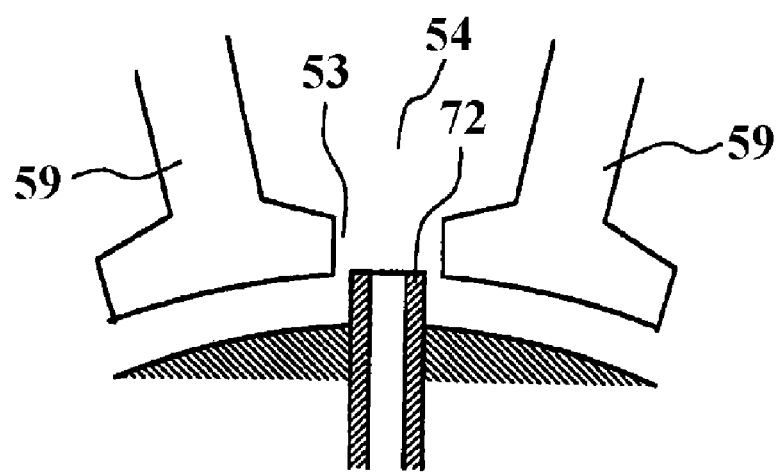
FIG. 24 is a view, in part similar to FIG. 23, and shows another embodiment.

In another embodiment, as shown in FIG. 24, the needle need not be positioned in the slot 54 but only the gap 53 between the pole teeth. This particular arrangement is useful with the configurations shown in FIGS. 14 and 15 where the round 66 will smoothly guide the wire strand 69 down to the insulator insert 65.

Figure 25:
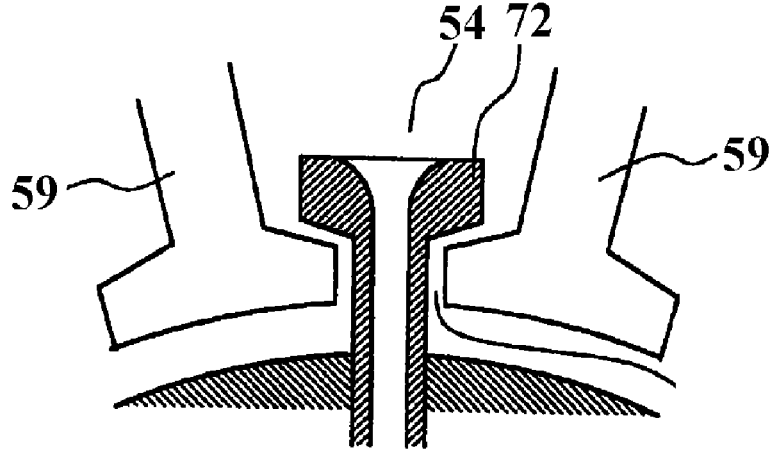
FIG. 25 is a view, in part similar to FIGS. 23 and 24, and shows yet another embodiment.

FIG. 25 shows another needle form wherein the needle has an enlarged end portion and actually is disposed in the gap 53. Again, however, this will be in the area where the winding will be the least and will not obscure the filling of the remaining portion of the slot 54 with coil winding. This also permits the outer opening 73 of the needle 72 to be formed with a round as shown in this figure. This further protects the enameled insulation of the wire strands 69 from damage.

It should be noted that the winding method described is very effective in ensuring that the needle or the windings do not engage each other so that the insulation on the individual wires will not be scraped off and good density can be achieved.

Figure 26:
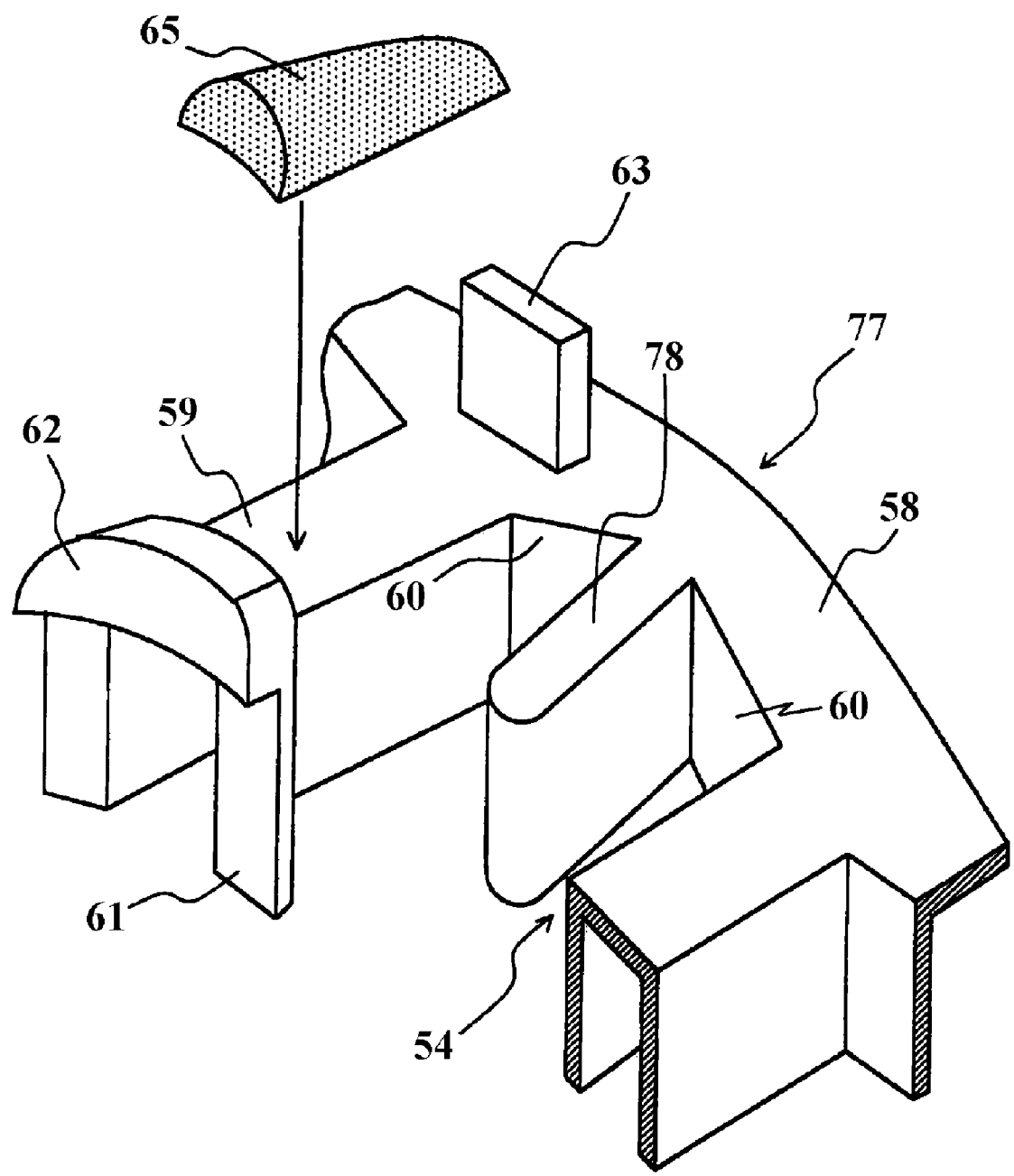
FIG. 26 is an exploded perspective view, in part similar to FIG. 2, and shows another embodiment of the invention.

This can further be improved by utilizing an insulator, indicated generally by the reference numeral 77 in FIG. 26, and which has the structure basically the same as that previously described. Where the portions of the structure are the same, they have been indicated by the same reference numerals.

Figure 27:
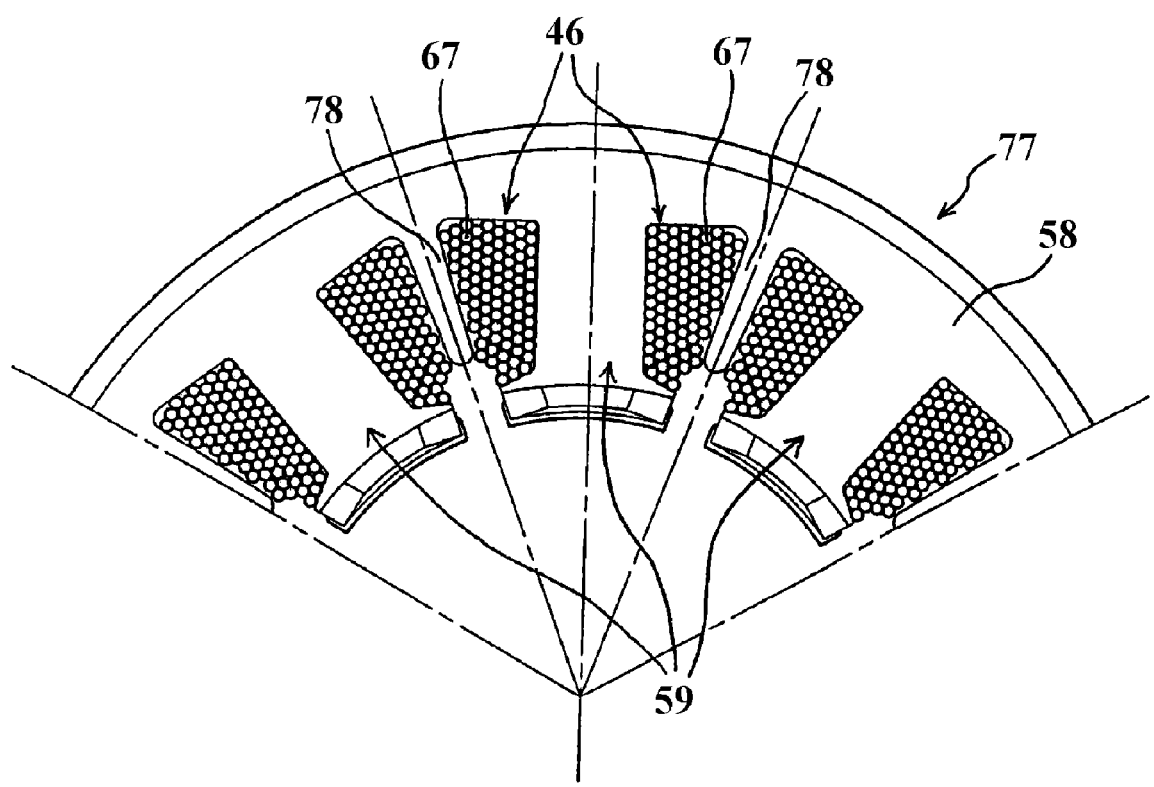
FIG. 27 is a view, in part similar to FIG. 20, but showing the resulting wiring of the embodiment shown in FIG. 26.

In this embodiment, however, the area between the inclined surfaces 60 at the radially outer periphery of the slot 54 is formed with a dividing wall 78. This dividing wall 78 lies in the area where the needle 72 will not pass but nevertheless will hold the wires at the outer periphery of the pole teeth individual leg 59 in separated form so as to result in a winding as shown in FIG. 27 which further improves the density and, at the same time, eliminates the possibility of interference between the windings on adjacent pole teeth 49.

Figure 28:
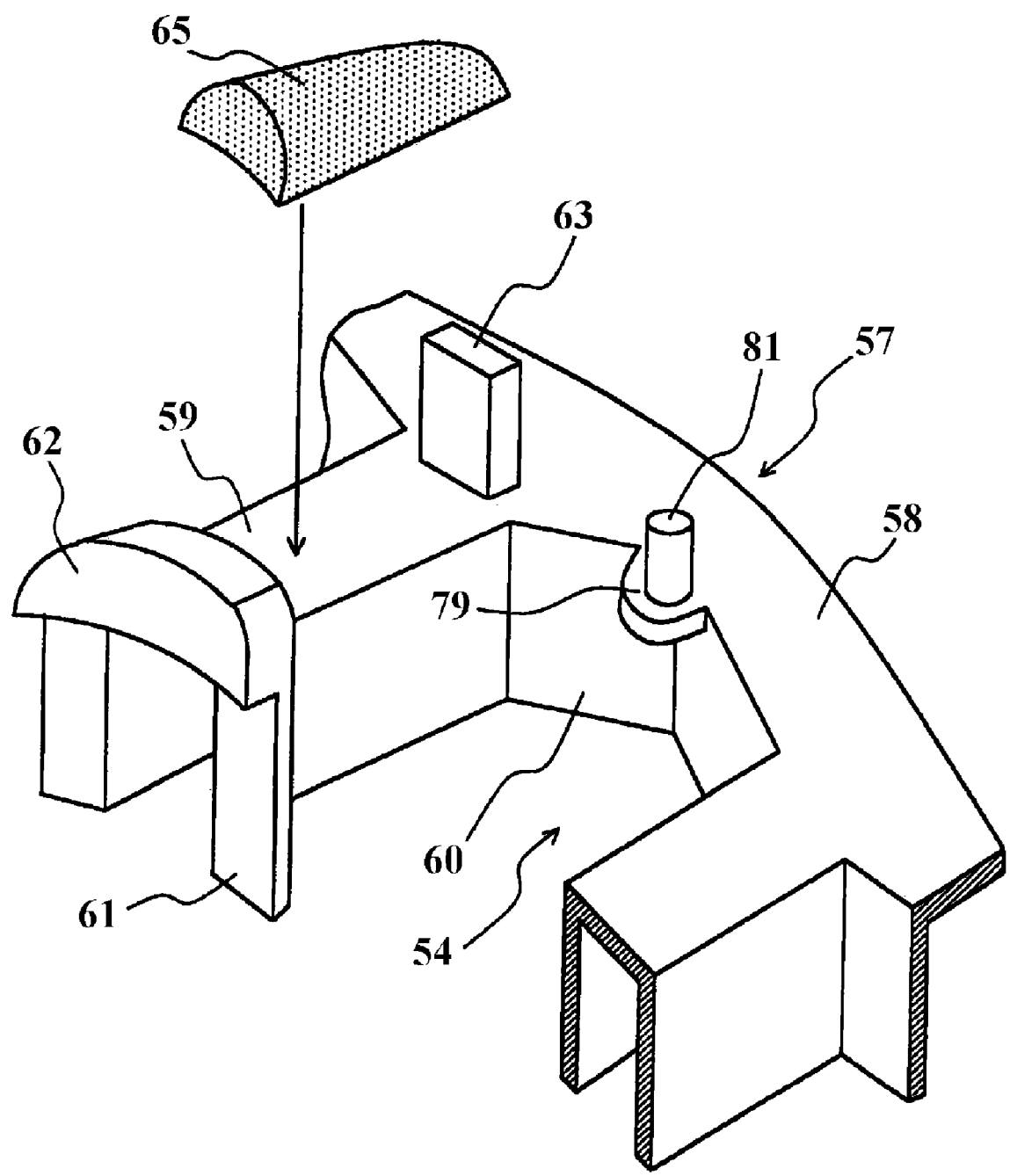
FIG. 28 is an exploded perspective view, in part similar to FIGS. 2 and 26, and shows a further embodiment of the invention.
Figure 29:
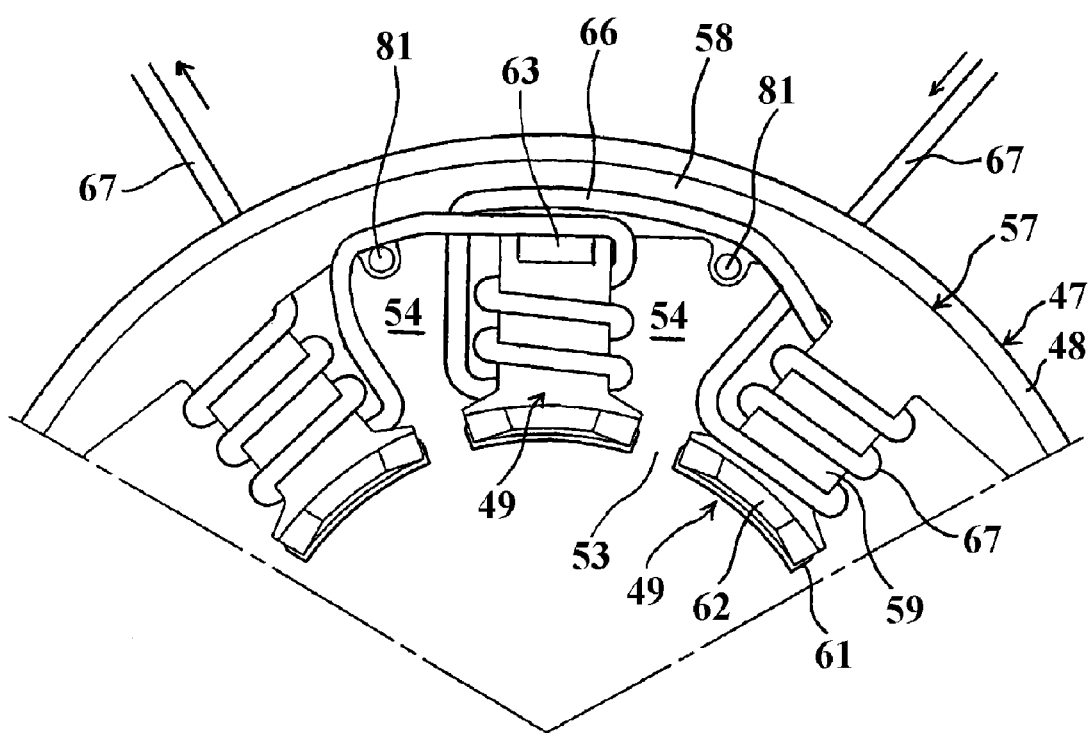
FIG. 29 is an end view, in part similar to FIG. 16, but shows the winding in accordance with the embodiment of FIG. 28.
Figure 30:
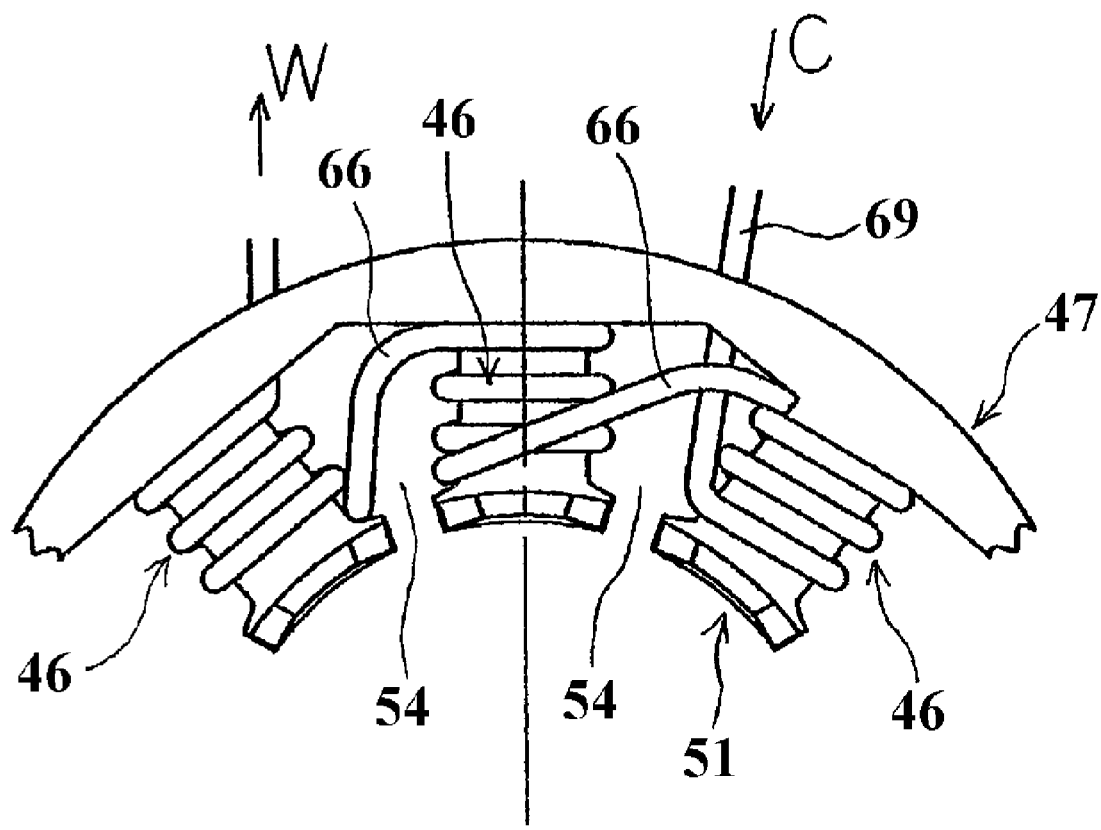
FIG. 30 is a partial side elevational view in part similar to FIGS. 16 and 19 and shows a still further embodiment of the invention.
Figure 31:
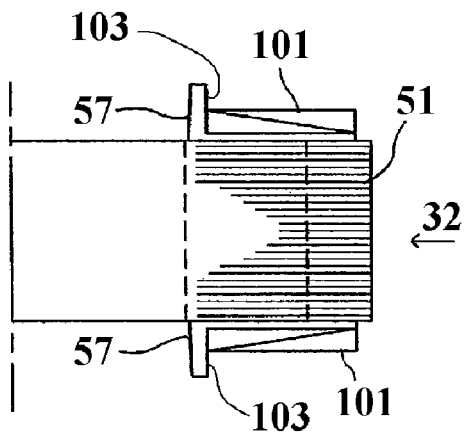
FIG. 31 is a cross sectional view of one of the poll teeth of this embodiment with the coil winding removed.
Figure 32:
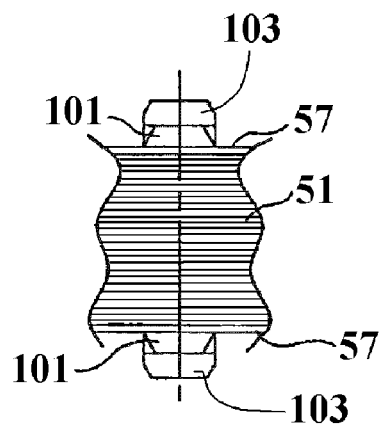
FIG. 32 is a partial end elevational view taken in the direction of the arrow 32 in FIG. 31.
Figure 33:
FIG. 33 is a cross sectional view of the upper bobbin half taken along the same plane as FIG. 31.
Figure 34:
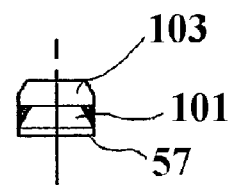
FIG. 34 is an end elevational view taken in the direction of the arrow 34 in FIG. 33.

FIGS. 28 and 29 show another embodiment wherein instead of the dividing wall 78, there is provided a tab like projection 79 that carries a guide post 81. The guide post 81 may be used to loop the end of one winding toward the other and will assist in maintaining a more compact assembly and again improves the density.

After the desired of the winding methods have been performed utilizing the preferred insulator construction and needle configuration, a controller assembly of any desired type 82 (FIG. 1) is mounted on the further projections 64 of the insulating bobbin forming member 57A.

The foregoing description includes and was taken from our aforenoted first mentioned co-pending application. As already noted, although those embodiments represent a considerable advance in the art, further improvements are possible. FIGS. 31–35 show one form such further improvements may take.

Referring now to these figures and this added embodiment of the invention, only a section of the stator is shown as the remainder of the machine may be of any type including those previously described. Also where parts are the same as the embodiment of FIGS. 1–10, they have been identified by the same reference numerals and will be described further only where necessary to permit those skilled in the art to practice this embodiment.

In this embodiment adjacent coil windings 46 interconnected by crossover wires 66 passed in the slots 54 formed between the pole teeth 51. In this coil structure, the coils 46 are wound around the stator of the three-phase motor having three phases of UVW continuously formed with the coils wound alternately in opposite directions as shown in FIG. 9.

For such coils wound alternately in opposite directions, the coils 46 are continuously formed between the adjacent magnetic pole teeth 51 so that the crossover wires 66 are disposed between the coils 46 formed on the adjacent magnetic pole teeth 51. Thus, even if the crossover wires 66 are disposed across the slots 54, the needles are not passed through the slots in winding the coil as described before (FIGS. 18 and 19), thereby preventing the crossover wires 66 from being damaged or broken by the contact with the needle.

The crossover wires 66 are disposed through the slots 54 in such a manner, whereby there is no need to form a protrusion for hooking a crossover wire as in the previous embodiments so that the insulator structure is simplified and wiring can be easily carried out by saving the crossover wires from being hooked on the protrusions to be disposed in forming the coil. Also, the wiring length becomes shorter, which may result in reducing wiring resistance.

In the above embodiment, the tapered members 65 are used as a wound wire transfer means to slide the windings wound around the protruding end side of the magnetic pole teeth down to its root side without inserting the needle into the slot. However, the coils can also be wound around the magnetic pole teeth from their root sides by using circumference changing members 101 in lieu of such taper members, or by controlling the looping action of the needle to provide slack in the windings as it is drawn out, and thus sliding the windings down to the root sides.

As seen best in FIGS. 31–35 a circumference changing member 101 according to the invention is used in place of the before-mentioned taper members 65. The circumference changing member 101 may be a separate member from the insulating bobbin forming members 57 or a member molded integrally therewith.

Figure 35:
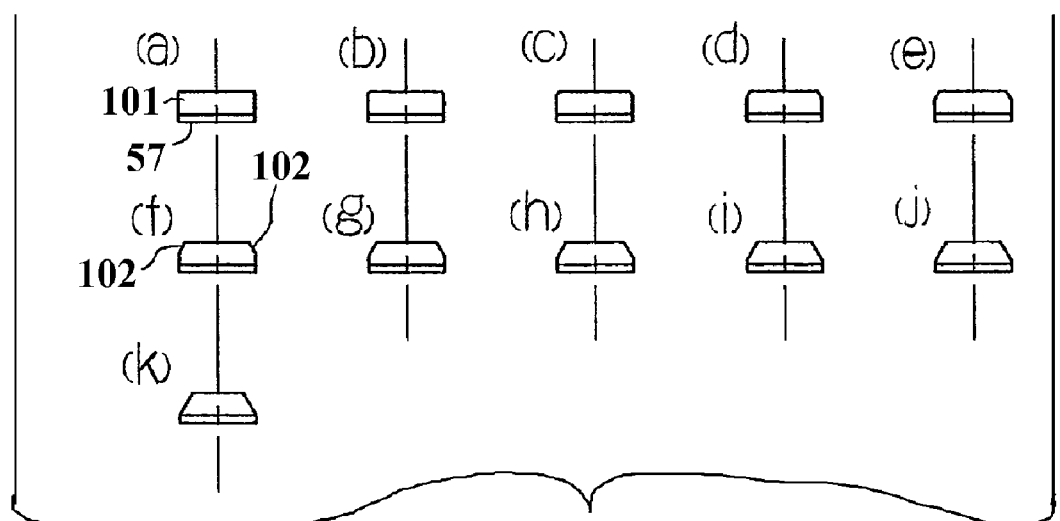
FIGS. 35*a*–35*k* are a series of cross sectional views taken at equal intervals along the length of FIG. 33 starting at the base of the pole tooth (left hand side) and ending at the tip (right hand side) thereof.

As shown best in FIG. 35, the circumference changing member 101 is chamfered as indicated at 102 at its opposite ends on the upper surface wherein the amount of this chamfering is gradually increasing from the positions of (a) through (k) toward the outer periphery. This gradually shortens the surface length of the circumference changing member 101 and accordingly the length or circumference around which each turn of the coil winding 46 makes progressing toward the tips of the pole teeth 51.

Gradually shortening the circumference in such manner allows a drawing support point of the winding that is drawn out of the needle to be disposed on the outer periphery side and allows the winding to easily slide outward when the winding is wound around the inner periphery side as seen ion FIG. 29. Therefore, the needle winding action outside of the slot 54 (out of the inner periphery side in this example) or adjacent the inlet of the slot 54 without inserting the needle into the slot 54 allows the winding to be wound on the magnetic pole tooth 51 to the bottom side of the slot 54. In this case, as to the needle winding action, it is desirable to increase trail displacement of the loop to the extent of providing slack in the winding in order to carry out the winding action.

Thus, the drawing support point of the winding drawn out of the needle is located at the bottom of the slot to provide slack in the winding for the needle's winding action, which enables the winding to smoothly slide down to form the coil 46 on the magnetic pole tooth 51 while keeping the height of the circumference changing member 101 constant.

However the upper surface of the circumference changing member 101 may be inclined downwardly toward the bottom side as with the before-mentioned taper members 65. Forming such an inclined surface also enables the winding to slide down to the bottom side as described before. However, forming such an inclined surface makes the height of the circumference changing member on the inlet side of the slot greater, resulting in a large protrusion of the coil ends, and therefore, a greater profile thereof in the radial direction, as aforenoted. With respect to this, keeping the height constant as in the example shown in FIGS. 29–35 enables to obtain a stator with a compact profile.

Although not necessary, a projection 103 may be formed either on the bobbin 57 at the base of the circumference changing member 101 or on the circumference changing member 101 itself.

Thus, from the foregoing description, it should be readily apparent that the described structures and winding methods provide very dense coil windings and afford very rapid winding methods at a relatively low cost as compared to the prior art constructions and methods. Of course, the foregoing description is that of preferred embodiments of the invention and various changes and modifications in addition to those mentioned may be made without departing from the spirit and scope of the invention, as defined by the appended claims.

What is claimed is:

1. A method of winding the coils of a rotating electrical machine comprising providing a circular core of magnetic material with a plurality of magnetic pole teeth extending radially from the circular core, adjacent pairs of the magnetic pole teeth defining slots formed there between, each of the slots defining a mouth that is formed between adjacent outer ends of the pole teeth, said method comprising positioning a threading needle having an opening through which the wire for the winding of the coils is fed into proximity to one of the mouths, moving the needle opening in a path around one of the pole teeth and at one side of the slot without moving the needle in any substantial distance along the length of the one pole tooth to form a first winding, continuing the movement of the needle opening in a path around the one of the pole teeth at the one side of the slot without moving the needle in any substantial distance along the length of the one pole tooth to form succeeding windings, the circumferential length of the pole teeth decreasing in an axial direction along their length from the opening toward the core, and holding the wire end at the end of the pole tooth spaced from the needle so that each successive winding forces the previous winding along the pole tooth toward the circular core without requiring movement of the needle in any substantial distance into the slot.

2. The method as set forth in claim 1 wherein the circumferential length of the pole teeth is decreased in an axial direction along their length by employing insulator having a circumferential length that decreases in an axial direction along their length interposed between the pole teeth and the windings.

3. The method as set forth in claim 2 wherein the circumferential length of the insulators is changed by a portion formed on a face of the insulators.

4. The method as set forth in claim 3 wherein the portion of the insulator is formed on a face thereof that does not extend into the slot on either side of the respective pole tooth.

5. The method as set forth in claim 3 wherein the portion is generally rectangular with the circumferential length being changed by providing a tapering chamfer on opposite sides thereof.

6. The method as set forth in claim 5 wherein the portion of the insulator is formed on a face thereof that does not extend into the slot on either side of the respective pole tooth.

7. The method as set forth in claim 6 wherein the chamfered sides are the sides adjacent the slots.

8. The method as set forth in claim 3 wherein the portion is formed by a separate member affixed to the insulator.

9. The method as set forth in claim 8 wherein the separate member is fixed to a face of the insulator that does not extend into the slot on either side of the respective pole tooth.

10. The method as set forth in claim 9 wherein the separate member is generally rectangular with the circumferential length being changed by providing a tapering chamfer on opposite sides thereof.

11. The method as set forth in claim 10 wherein the chamfered sides are the sides adjacent the slots.

\* \* \* \* \*